(12) United States Patent
Seok

(10) Patent No.: US 9,749,371 B2
(45) Date of Patent: Aug. 29, 2017

(54) METHOD AND APPARATUS FOR MULTICASTING/BROADCASTING IN RELAY NETWORK OF WIRELESS LAN SYSTEM

(71) Applicant: LG ELECTRONICS INC., Seoul (KR)

(72) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 14/758,001

(22) PCT Filed: Oct. 30, 2013

(86) PCT No.: PCT/KR2013/009740
§ 371 (c)(1),
(2) Date: Jun. 26, 2015

(87) PCT Pub. No.: WO2014/104556
PCT Pub. Date: Jul. 3, 2014

(65) Prior Publication Data
US 2015/0381676 A1 Dec. 31, 2015

Related U.S. Application Data

(60) Provisional application No. 61/746,534, filed on Dec. 27, 2012.

(51) Int. Cl.
*H04L 29/06* (2006.01)
*H04W 4/06* (2009.01)
(Continued)

(52) U.S. Cl.
CPC ..... *H04L 65/4076* (2013.01); *H04B 7/15507* (2013.01); *H04L 61/6022* (2013.01);
(Continued)

(58) Field of Classification Search
CPC ................ H04L 12/18; H04L 12/1845; H04L 29/06455; H04L 29/12292; H04L 45/16;
(Continued)

(56) References Cited

U.S. PATENT DOCUMENTS

2006/0256741 A1 11/2006 Nozaki
2009/0310528 A1 12/2009 Tamura
(Continued)

FOREIGN PATENT DOCUMENTS

CN 102812648 A 12/2012
EP 1762020 B1 10/2009
(Continued)

OTHER PUBLICATIONS

"Part 11: Wireless LAN Medium Access Control (MAC) and Physical Layer (PHY) Specification", IEEE Std. 802.11—2007 (Revision of IEEE Std. 802.11—1999), IEEE Computer Society, Mar. 8, 2007.

(Continued)

*Primary Examiner* — Benjamin H Elliott, IV
(74) *Attorney, Agent, or Firm* — Dentons US LLP

(57) ABSTRACT

The present disclosure relates to a wireless communication system and, more particularly, to a method and apparatus for multicasting/broadcasting in a relay network of a wireless LAN system. A method by which a relay entity delivers a multicast/broadcast frame in a wireless LAN system, according to one embodiment of the present disclosure, includes the steps of: receiving a multicast/broadcast frame from an STA; and delivering the multicast/broadcast frame to a root access point (AP). The multicast/broadcast frame may be transmitted by the root AP in a broadcast scheme within a basic service set (BSS). In the multicast/broadcast frame transmitted in the broadcast scheme by the root AP, an address 1 (A1) field may be set to a multicast/broadcast (Continued)

address, an Address 2 (A2) field may be set to a medium access control (MAC) address of the root AP, and an Address 3 (A3) field may be set as a MAC address of the STA, which is a source address of the multicast/broadcast frame.

14 Claims, 16 Drawing Sheets

(51) Int. Cl.
 *H04B 7/155* (2006.01)
 *H04L 29/12* (2006.01)
 *H04W 76/02* (2009.01)
 *H04W 84/12* (2009.01)

(52) U.S. Cl.
 CPC ........... *H04W 4/06* (2013.01); *H04W 76/021* (2013.01); *H04W 84/12* (2013.01)

(58) Field of Classification Search
 CPC ..... H04L 47/15; H04L 47/806; H04L 49/201; H04L 61/2069; H04L 65/4076; H04L 12/40071; H04L 29/08702; H04L 29/08864; H04L 29/08882; H04L 45/127; H04L 47/724; H04L 51/06; H04L 51/18; H04L 65/605; H04L 67/28; H04L 67/2871; H04L 67/288; H04W 4/005; H04W 28/0215; H04W 40/22; H04W 88/04; H04W 88/182
 See application file for complete search history.

(56) References Cited

U.S. PATENT DOCUMENTS

| 2012/0087300 | A1* | 4/2012 | Seok | H04W 76/02 370/315 |
| 2012/0099567 | A1* | 4/2012 | Hart | H04L 12/4633 370/338 |
| 2013/0195001 | A1* | 8/2013 | Liu | H04L 69/04 370/312 |
| 2013/0301553 | A1* | 11/2013 | Klein | H04W 84/12 370/329 |
| 2015/0381676 | A1* | 12/2015 | Seok | H04W 4/06 370/315 |

FOREIGN PATENT DOCUMENTS

| JP | 2006-319676 A | 11/2006 | |
| JP | 2006-325213 A | 11/2006 | |
| JP | 2009-017144 A | 1/2009 | |
| KR | 10-2008-0002296 A | 1/2008 | |
| KR | 10-2011-0102847 A | 9/2011 | |
| WO | WO 2010143894 A2 * | 12/2010 | ............ H04W 76/02 |

OTHER PUBLICATIONS

S. Abraham et al., "Relays for 802.11ah", IEEE 802.11-12/1323r0, Nov. 12, 2012.

* cited by examiner

METHOD AND APPARATUS FOR MULTICASTING/BROADCASTING IN RELAY NETWORK OF WIRELESS LAN SYSTEM

This application is a 35 USC §371 National Stage entry of International Application No. PCT/KR2013/009740 filed on Oct. 30, 2013, and claims priority to U.S. Provisional Application No. 61/746,534 filed on Dec. 27, 2012, both of which are hereby incorporated by reference in their entireties as if fully set forth herein.

TECHNICAL FIELD

The present disclosure relates to a wireless communication system and, more particularly, to a method and apparatus for performing multicast/broadcast in a relay network of a WLAN system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

DISCLOSURE

Technical Problem

Machine-to-machine (M2M) communication technology has been discussed as a next generation communication technology. A technical standard to support M2M communication in the IEEE 802.11 WLAN system is also under development as IEEE 802.11ah. In M2M communication, a scenario in which occasional transmission/reception of a small amount of data is performed at a low speed in an environment including a large number of devices may be considered.

In addition, a relay may be introduced to a WLAN system in order to extend wireless coverage. The relay operates as a non-access point (AP) station (STA) with respect to an AP and as an AP with respect to other non-AP STAs. To correctly support the relay, a protocol needs to be defined, but has not been specifically defined yet. Further, a protocol for performing broadcast in a relay network has not been specifically defined.

An object of the present disclosure devised to solve the problem lies in a method for lowering complexity of a protocol for supporting a relay in a WLAN system and allowing the relay to correctly and efficiently operate.

Another object of the present disclosure is to provide a simplified relay protocol advantageously applicable to M2M communication, in which low-cost, low-complexity and low-power devices are used. Another object of the present disclosure is to a method for efficiently performing multicast/broadcast in a relay network.

Objects of the present disclosure are not limited to the aforementioned objects, and other objects of the present disclosure which are not mentioned above will become apparent to those having ordinary skill in the art upon examination of the following description.

Technical Solution

The object of the present disclosure can be achieved by providing a method for delivering a multicast/broadcast frame by a relay entity in a wireless local area network (WLAN) system, the method including receiving the multicast/broadcast frame from a station (STA), and delivering the multicast/broadcast frame to a root access point (root AP). The multicast/broadcast frame may be transmitted in a broadcasting manner by the root AP within a basic service set (BSS). The multicast/broadcast frame transmitted in the broadcasting manner by the root AP may include an Address 1 (A1) field set to a multicast/broadcast address, an Address 2 (A2) field set to a medium access control (MAC) address of the root AP, and an Address 3 (A3) field set to a MAC address of the STA, the MAC address being a source address of the multicast/broadcast frame.

According to another aspect of the present disclosure, provided herein is a relay for delivering a multicast/broadcast frame in a wireless local area network (WLAN) system, the relay including a transceiver and a processor. The processor may be configured to receive the multicast/broadcast frame from a station (STA) using the transceiver and to deliver the multicast/broadcast frame to a root access point (root AP) using the transceiver. The multicast/broadcast frame may be transmitted in a broadcasting manner by the root AP within a basic service set (BSS). The multicast/broadcast frame transmitted in the broadcasting manner by the root AP includes an Address 1 (A1) field set to a multicast/broadcast address, an Address 2 (A2) field set to a medium access control (MAC) address of the root AP, and an Address 3 (A3) field set to a MAC address of the STA, the MAC address being a source address of the multicast/broadcast frame.

The aforementioned aspects of the present disclosure may include the following elements in common.

When the multicast/broadcast frame delivered to the root AP is an aggregate-MAC service data unit (A-MSDU) frame, the A-MSDU frame may include an A1 field set to the MAC address of the root AP, an A2 field set to a MAC address of the relay entity, and an A3 field set to a basic service set identifier (BSSID). An A-MSDU subframe of the A-MSDU frame may include a destination address (DA) field set to the multicast/broadcast address, and a source address (SA) field set to the MAC address of the STA, the MAC address being the source address of the multicast/broadcast frame.

When the multicast/broadcast frame delivered to the root AP has four address fields, the four address fields may include an A1 field set to the MAC address of the root AP, an A2 field set to a MAC address of the relay entity, an A3 field set to the multicast/broadcast address, and an A4 (Address 4) field set to the MAC address of the STA, the MAC address being the source address of the multicast/broadcast frame.

When receiving the multicast/broadcast frame from the STA is performed, the multicast/broadcast frame may be delivered to the relay entity by the STA in a unicasting manner rather than being transmitted in the broadcasting manner.

When delivering the multicast/broadcast frame to the root AP is performed, the multicast/broadcast frame received from the STA may be delivered to the root AP by the relay entity in a unicasting manner rather than being transmitted in the broadcasting manner.

The STA may be associated with the relay entity.

The relay entity may be associated with the AP.

An STA having an address identical to the source address of the multicast/broadcast frame broadcast by the AP may discard the multicast/broadcast frame.

The above general description and the following detailed description of the present disclosure are exemplarily given to supplement the recitations in the claims.

Advantageous Effects

As is apparent from the above description, exemplary embodiments of the present disclosure can provide a method and apparatus for supporting a new protocol for a relay in a WLAN system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure.

BEST MODE

Figure 1:
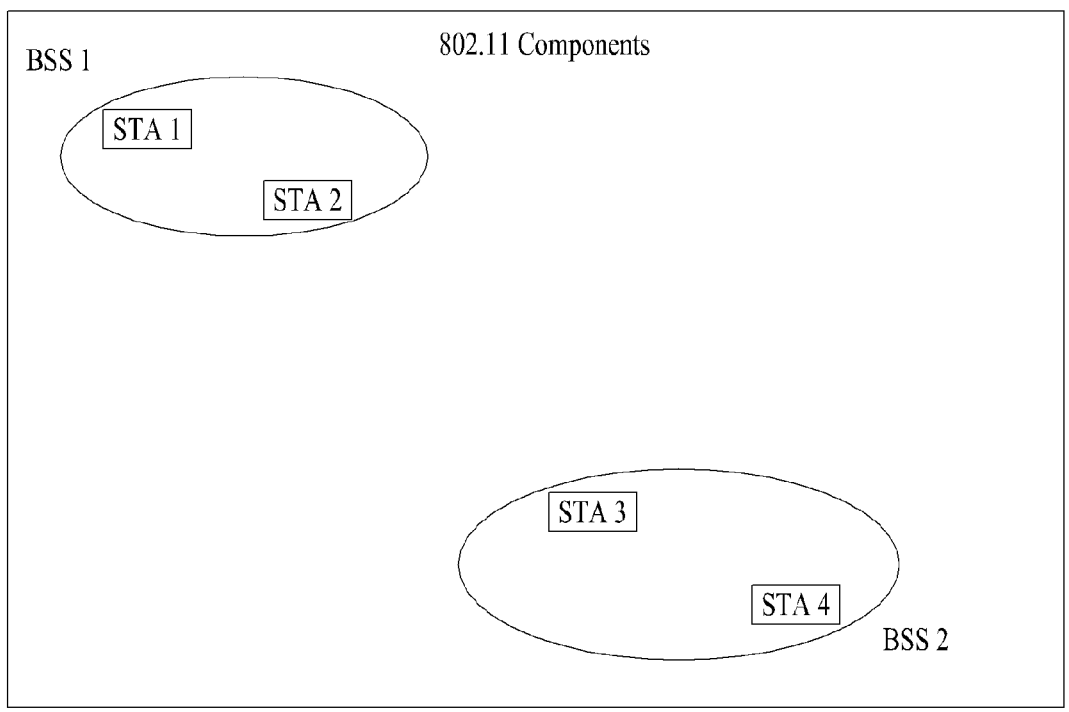
FIG. 1 exemplarily shows an IEEE 802.11 system according to one embodiment of the present invention.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

The following embodiments are proposed by combining constituent components and characteristics of the present disclosure according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present disclosure. The order of operations to be disclosed in the embodiments of the present disclosure may be changed. Some components or characteristics of any embodiment may also be included in other embodiments, or may be replaced with those of the other embodiments as necessary.

It should be noted that specific terms disclosed in the present disclosure are proposed for convenience of description and better understanding of the present disclosure, and the use of these specific terms may be changed to other formats within the technical scope or spirit of the present disclosure.

In some instances, well-known structures and devices are omitted in order to avoid obscuring the concepts of the present disclosure and important functions of the structures and devices are shown in block diagram form. The same reference numbers will be used throughout the drawings to refer to the same or like parts.

Exemplary embodiments of the present disclosure are supported by standard documents disclosed for at least one of wireless access systems including an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present disclosure, in the embodiments of the present disclosure may be supported by the above documents. All terminology used herein may be supported by at least one of the above-mentioned documents.

The following embodiments of the present disclosure can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present disclosure are not limited thereto.

WLAN System Structure

FIG. 1 exemplarily shows an IEEE 802.11 system according to one embodiment of the present disclosure.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
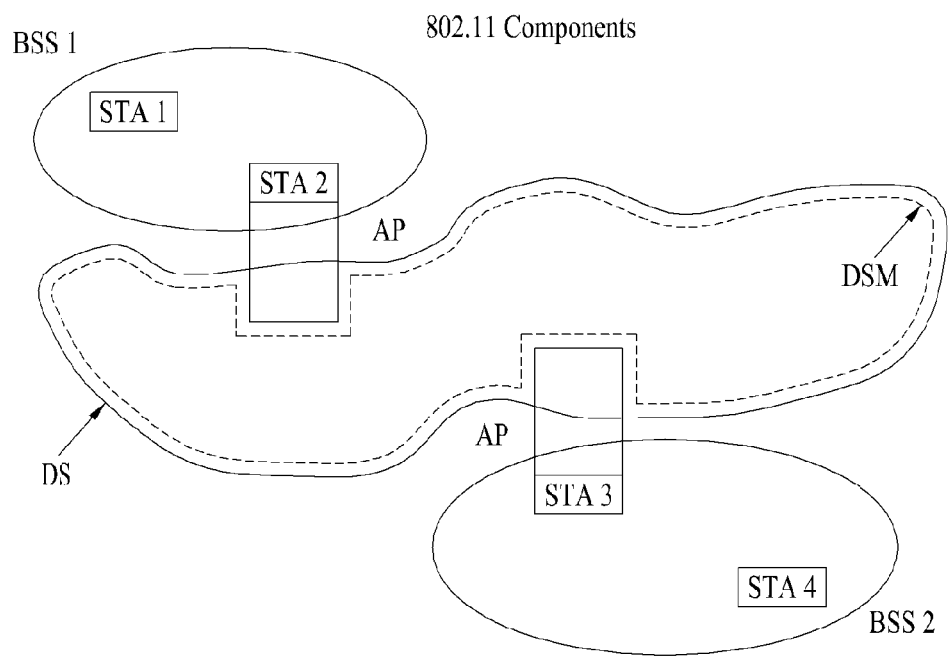
FIG. 2 exemplarily shows an IEEE 802.11 system according to another embodiment of the present invention.

FIG. 2 is a diagram showing another exemplary structure of an IEEE 802.11 system to which the present disclosure is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
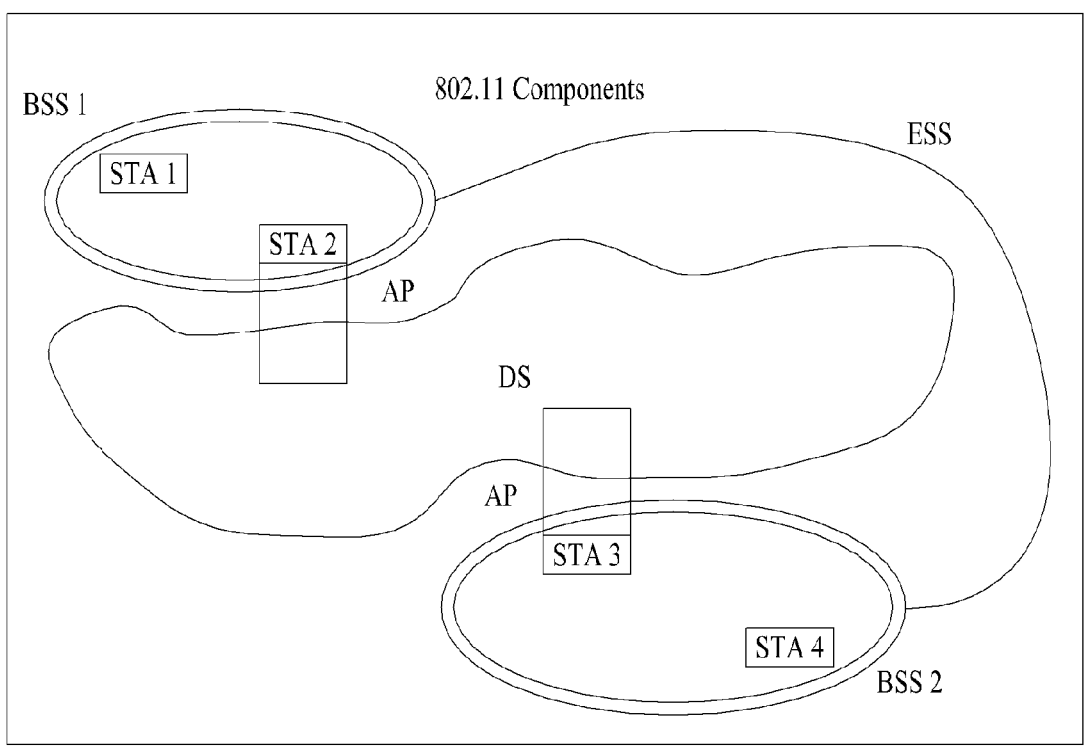
FIG. 3 exemplarily shows an IEEE 802.11 system according to still another embodiment of the present invention.

FIG. 3 is a diagram showing still another exemplary structure of an IEEE 802.11 system to which the present disclosure is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
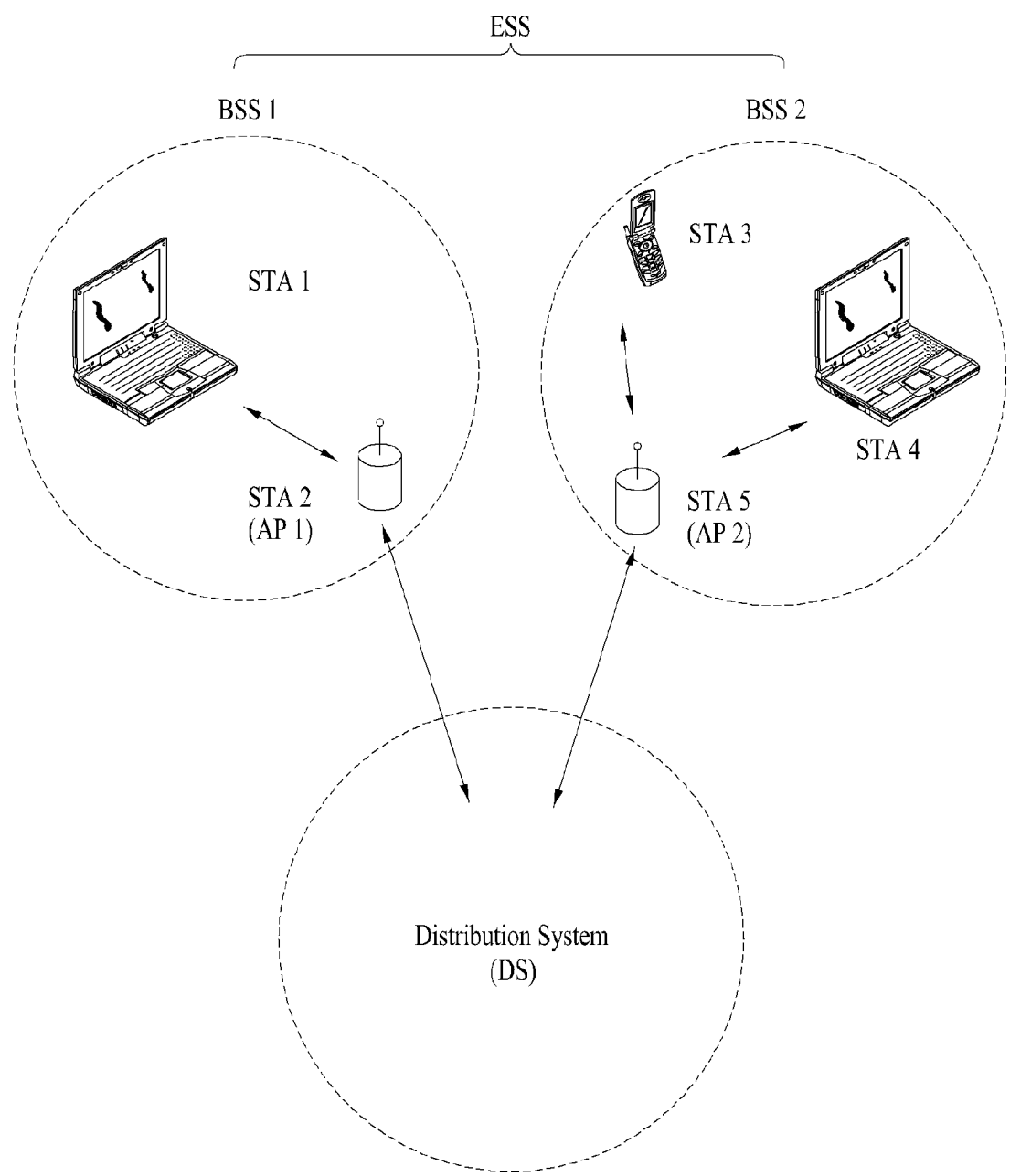
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Link Setup Process

Figure 5:
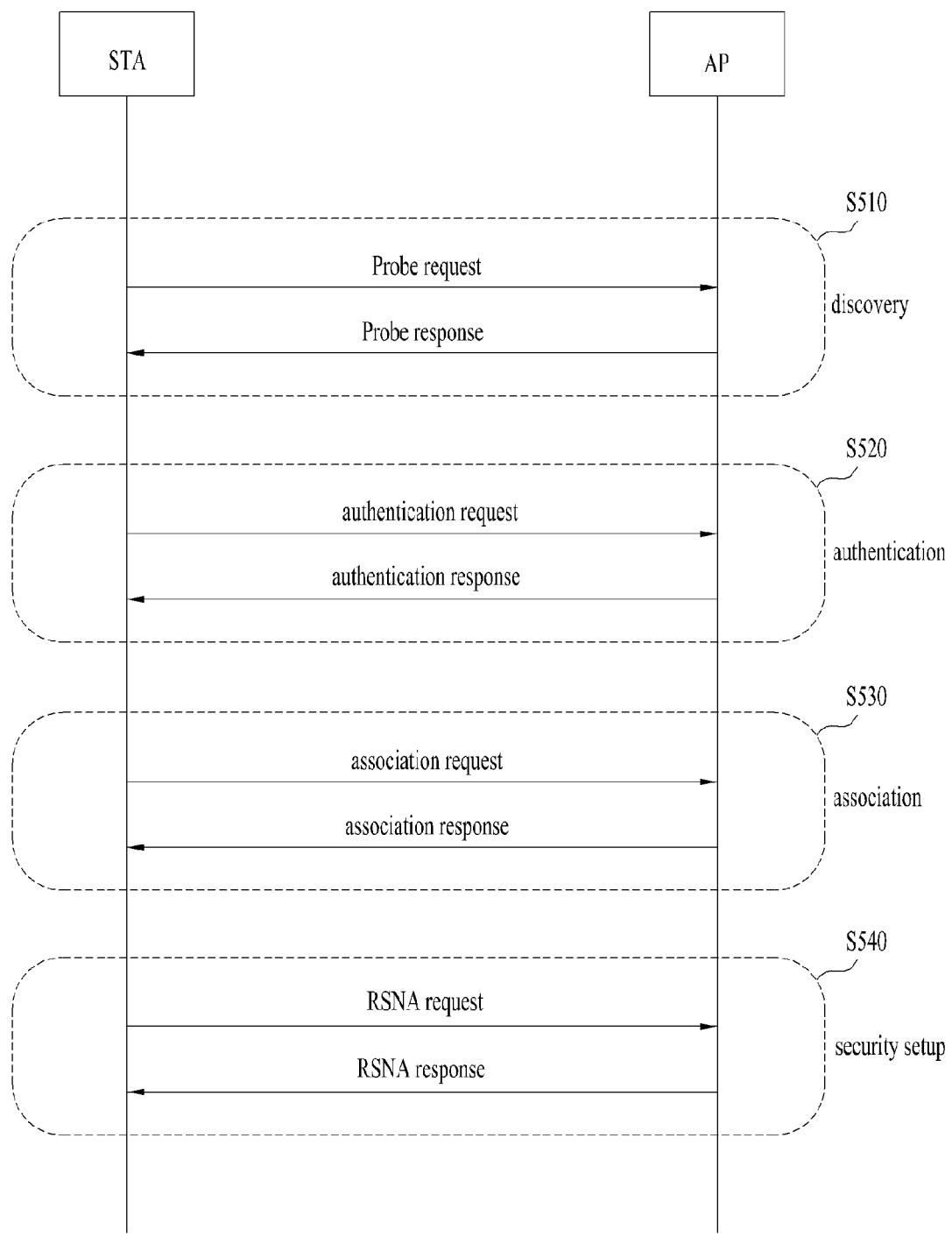
FIG. 5 is a flowchart illustrating a link setup process for use in the WLAN system.

FIG. 5 is a flowchart explaining a general link setup process according to an exemplary embodiment of the present disclosure.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a HT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11-based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
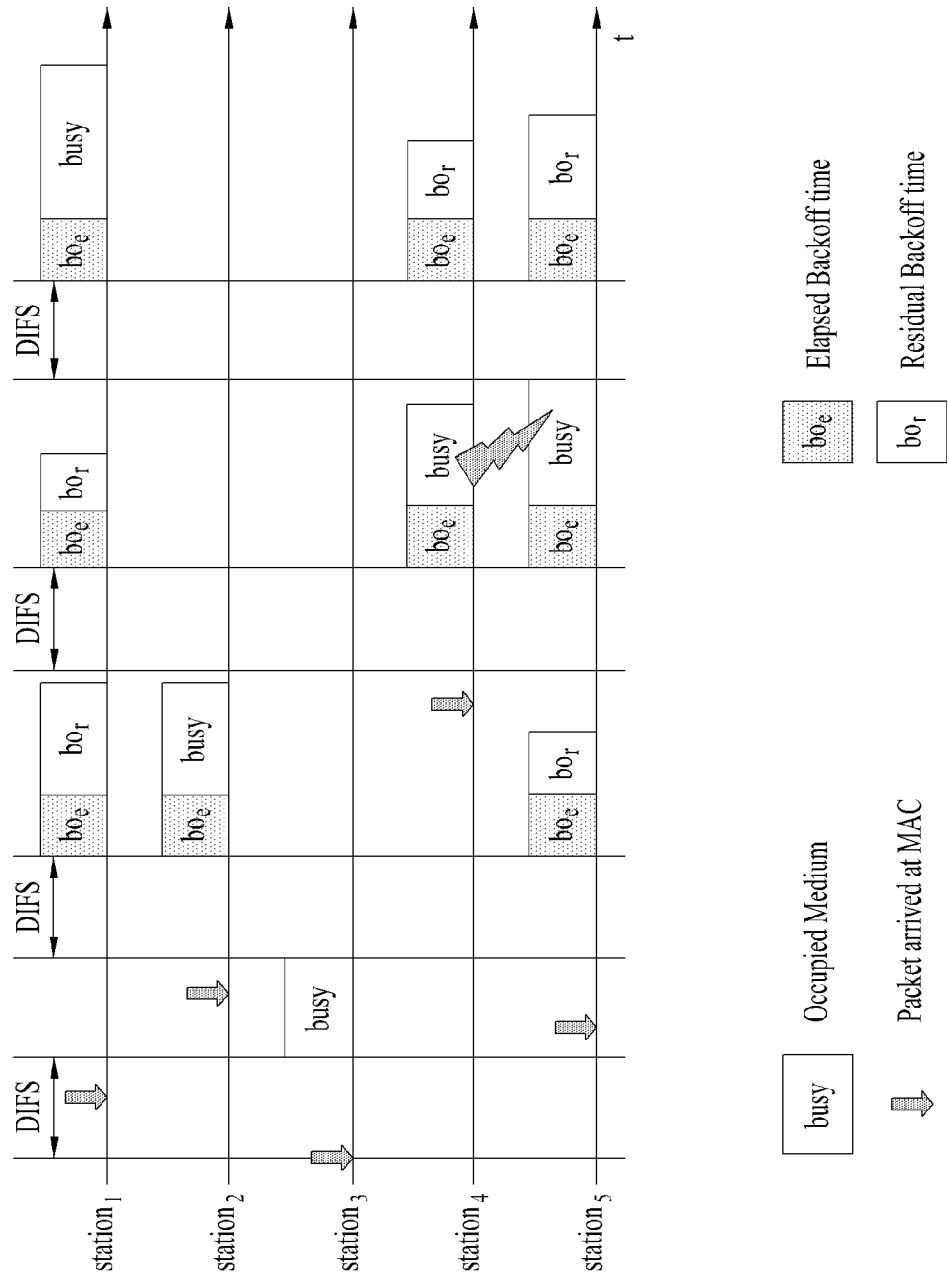
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present disclosure.

Figure 7:
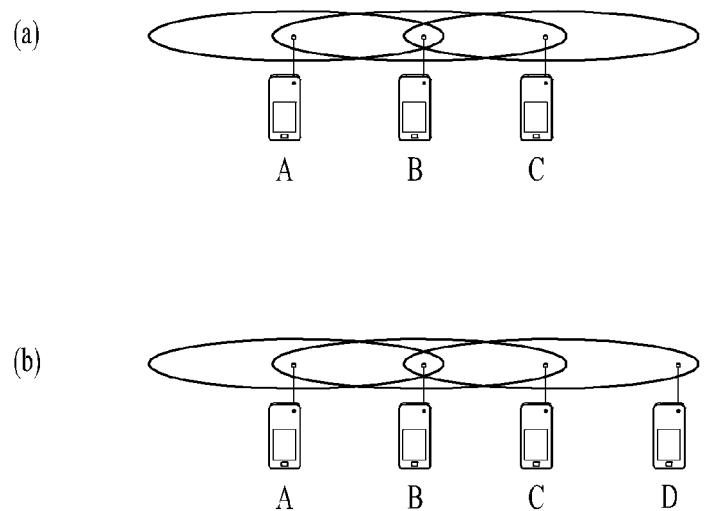
FIGS. 7(a) and 7(b) are conceptual diagrams illustrating a hidden node and an exposed node.

FIG. 7 is a conceptual diagram illustrating a hidden node and an exposed node.

FIG. 7(*a*) exemplarily shows the hidden node. In FIG. 7(*a*), STA A communicates with STA B, and STA C has information to be transmitted. In FIG. 7(*a*), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(*b*) exemplarily shows an exposed node. In FIG. 7(*b*), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
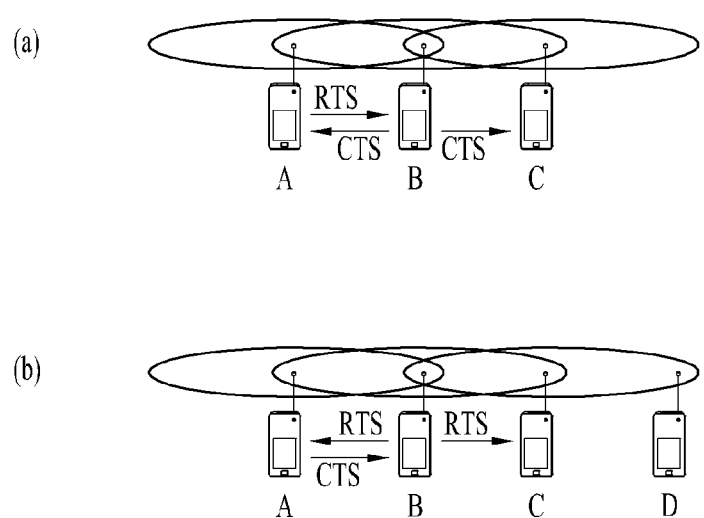
FIGS. 8(a) and 8(b) are conceptual diagrams illustrating RTS (Request To Send) and CTS (Clear To Send).

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(*a*) exemplarily shows the method for solving problems of the hidden node. In FIG. 8(*a*), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(*b*) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the reception (Rx) state and the transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a power management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

Figure 9:
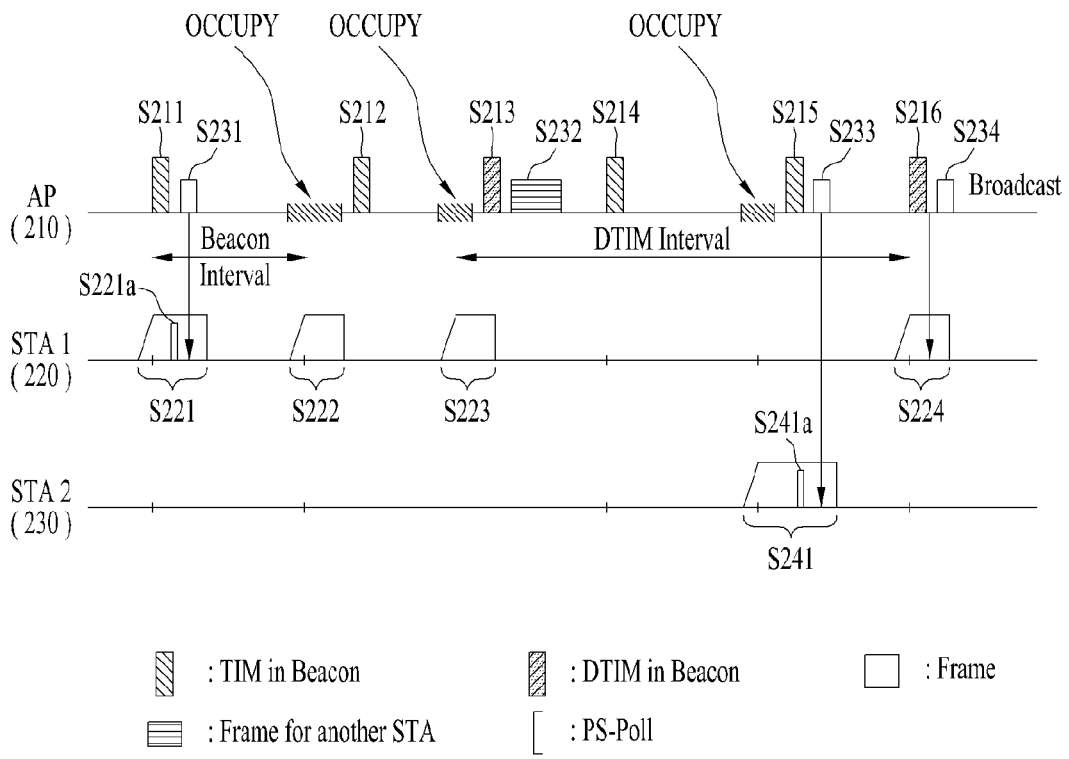
FIG. 9 is a conceptual diagram illustrating a power management operation.

FIG. 9 is a conceptual diagram illustrating a power management (PM) operation.

Referring to FIG. 9, AP 210 transmits a beacon frame to STAs present in the BSS at intervals of a predetermined time period in steps (S211, S212, S213, S214, S215, S216). The beacon frame includes a TIM information element. The TIM information element includes buffered traffic regarding STAs associated with the AP 210, and includes specific information indicating that a frame is to be transmitted. The TIM information element includes a TIM for indicating a unicast frame and a Delivery Traffic Indication Map (DTIM) for indicating a multicast or broadcast frame.

AP 210 may transmit a DTIM once whenever the beacon frame is transmitted three times. Each of STA1 220 and STA2 222 is operated in the PS mode. Each of STA1 220 and STA2 222 is switched from the sleep state to the awake state every wakeup interval, such that STA1 220 and STA2 222 may be configured to receive the TIM information element transmitted by the AP 210. Each STA may calculate a switching start time at which each STA may start switching to the awake state on the basis of its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state in step S221 when AP 210 first transmits the beacon frame in step S211. STA1 220 receives the beacon frame, and obtains the TIM information element. If the obtained TIM element indicates the presence of a frame to be transmitted to STA1 220, STA1 220 may transmit a Power Save-Poll (PS-Poll) frame, which requests the AP 210 to transmit the frame, to the AP 210 in step S221a. The AP 210 may transmit the frame to STA 1 220 in response to the PS-Poll frame in step S231. STA1 220 having received the frame is re-switched to the sleep state, and operates in the sleep state.

When AP 210 secondly transmits the beacon frame, a busy medium state in which the medium is accessed by another device is obtained, the AP 210 may not transmit the beacon frame at an accurate beacon interval and may transmit the beacon frame at a delayed time in step S212. In this case, although STA1 220 is switched to the awake state in response to the beacon interval, it does not receive the delay-transmitted beacon frame so that it re-enters the sleep state in step S222.

When AP 210 thirdly transmits the beacon frame, the corresponding beacon frame may include a TIM element denoted by DTIM. However, since the busy medium state is given, AP 210 transmits the beacon frame at a delayed time in step S213. STA1 220 is switched to the awake state in response to the beacon interval, and may obtain a DTIM through the beacon frame transmitted by the AP 210. It is assumed that DTIM obtained by STA1 220 does not have a frame to be transmitted to STA1 220 and there is a frame for another STA. In this case, STA1 220 confirms the absence of a frame to be received in the STA1 220, and re-enters the sleep state, such that the STA1 220 may operate in the sleep state. After the AP 210 transmits the beacon frame, the AP 210 transmits the frame to the corresponding STA in step S232.

AP 210 fourthly transmits the beacon frame in step S214. However, it is impossible for STA1 220 to obtain information regarding the presence of buffered traffic associated with the STA1 220 through double reception of a TIM element, such that the STA1 220 may adjust the wakeup interval for receiving the TIM element. Alternatively, provided that signaling information for coordination of the wakeup interval value of STA1 220 is contained in the beacon frame transmitted by AP 210, the wakeup interval value of the STA1 220 may be adjusted. In this example, STA1 220, that has been switched to receive a TIM element every beacon interval, may be switched to another operation state in which STA1 220 can awake from the sleep state once every three beacon intervals. Therefore, when AP 210 transmits a fourth beacon frame in step S214 and transmits a fifth beacon frame in step S215, STA1 220 maintains the sleep state such that it cannot obtain the corresponding TIM element.

When AP 210 sixthly transmits the beacon frame in step S216, STA1 220 is switched to the awake state and operates in the awake state, such that the STA1 220 is unable to obtain the TIM element contained in the beacon frame in step S224. The TIM element is a DTIM indicating the presence of a broadcast frame, such that STA1 220 does not transmit the PS-Poll frame to the AP 210 and may receive a broadcast frame transmitted by the AP 210 in step S234. In the meantime, the wakeup interval of STA2 230 may be longer than a wakeup interval of STA1 220. Accordingly, STA2 230 enters the awake state at a specific time S215 where the AP 210 fifthly transmits the beacon frame, such that the STA2 230 may receive the TIM element in step S241. STA2 230 recognizes the presence of a frame to be transmitted to the STA2 230 through the TIM element, and transmits the PS-Poll frame to the AP 210 so as to request frame transmission in step S241a. AP 210 may transmit the frame to STA2 230 in response to the PS-Poll frame in step S233.

In order to operate/manage the power save (PS) mode shown in FIG. 9, the TIM element may include either a TIM indicating the presence or absence of a frame to be transmitted to the STA, or a DTIM indicating the presence or absence of a broadcast/multicast frame. DTIM may be implemented through field setting of the TIM element.

Figure 10:
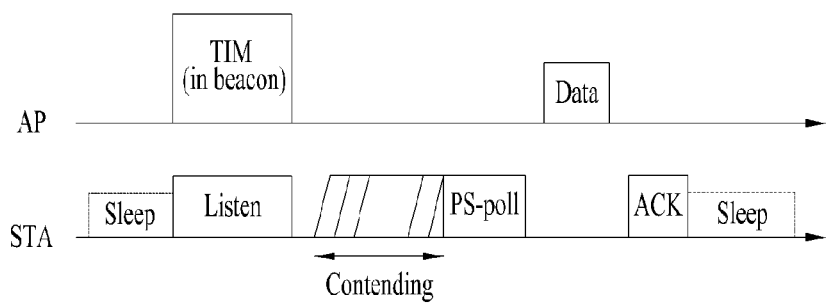
FIGS. 10 to 12 are conceptual diagrams illustrating detailed operations of a station (STA) having received a Traffic Indication Map (TIM).
Figure 11:
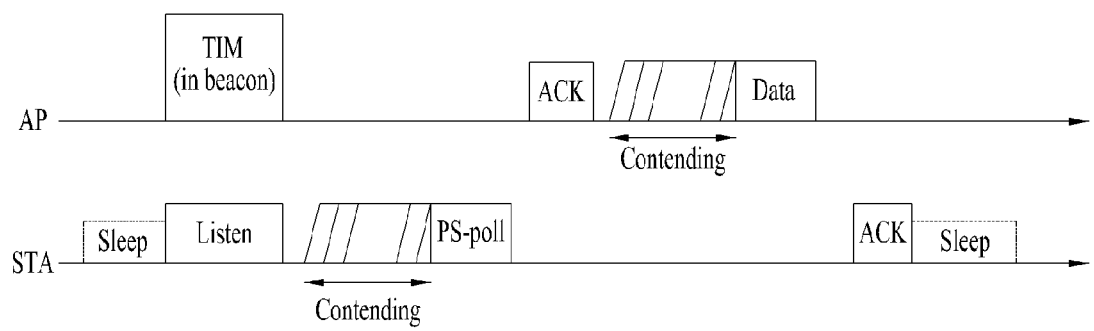
Figure 12:
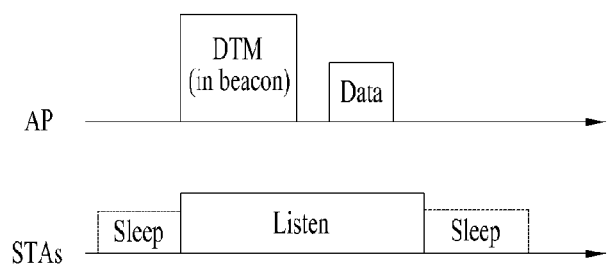

FIGS. 10 to 12 are conceptual diagrams illustrating detailed operations of the STA having received a Traffic Indication Map (TIM).

Referring to FIG. 10, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 10, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 11.

The STA operations of FIG. 11 in which the STA is switched from the sleep state to the awake state, receives a TIM from the AP, and transmits the PS-Poll frame to the AP through contention are identical to those of FIG. 10. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 12 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

TIM Structure

In the operation and management method of the Power save (PS) mode based on the TIM (or DTIM) protocol shown in FIGS. 9 to 12, STAs may determine the presence or absence of a data frame to be transmitted for the STAs through STA identification information contained in the TIM element. STA identification information may be specific information associated with an Association Identifier (AID) to be allocated when an STA is associated with an AP.

AID is used as a unique ID of each STA within one BSS. For example, AID for use in the current WLAN system may be allocated to one of 1 to 2007. In the case of the current WLAN system, 14 bits for AID may be allocated to a frame transmitted by AP and/or STA. Although the AID value may be assigned a maximum of 16383, the values of 2008~16383 are set to reserved values.

The TIM element according to legacy definition is inappropriate for application of M2M application through which many STAs (for example, at least 2007 STAs) are associated with one AP. If the conventional TIM structure is extended without any change, the TIM bitmap size excessively increases, such that it is impossible to support the extended TIM structure using the legacy frame format, and the extended TIM structure is inappropriate for M2M communication in which application of a low transfer rate is considered. In addition, it is expected that there are a very small number of STAs each having an Rx data frame during one beacon period. Therefore, according to exemplary application of the above-mentioned M2M communication, it is expected that the TIM bitmap size is increased and most bits are set to zero (0), such that there is needed a technology capable of efficiently compressing such bitmap.

In the legacy bitmap compression technology, successive values (each of which is set to zero) of 0 are omitted from a head part of bitmap, and the omitted result may be defined as an offset (or start point) value. However, although STAs each including the buffered frame is small in number, if there is a high difference between AID values of respective STAs, compression efficiency is not high. For example, assuming that the frame to be transmitted to only a first STA having an AID of 10 and a second STA having an AID of 2000 is buffered, the length of a compressed bitmap is set to 1990, the remaining parts other than both edge parts are assigned zero (0). If STAs associated with one AP is small in number, inefficiency of bitmap compression does not cause serious problems. However, if the number of STAs associated with one AP increases, such inefficiency may deteriorate overall system throughput.

Figure 13:
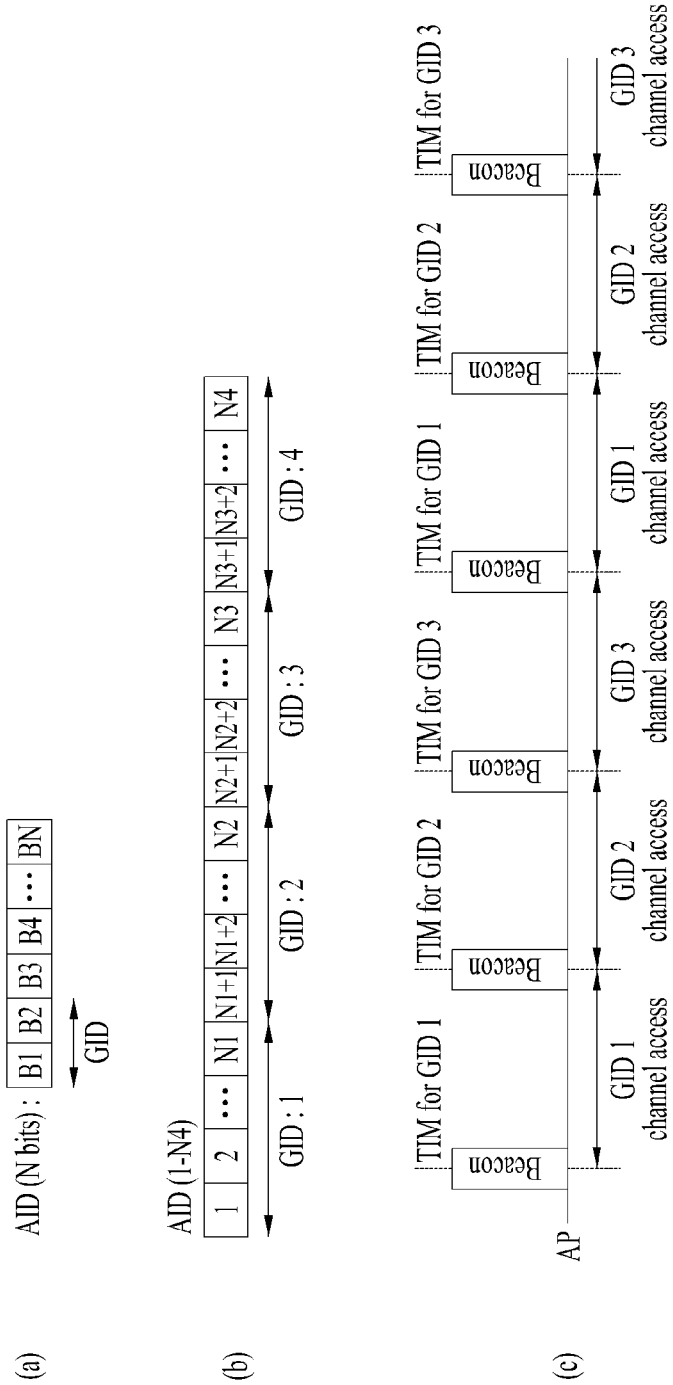
FIGS. 13(a), 13(b) and 13(c) are conceptual diagrams illustrating a group-based AID.

In order to solve the above-mentioned problems, AIDs are divided into a plurality of groups such that data can be more efficiently transmitted using the AIDs. A designated group ID (GID) is allocated to each group. AIDs allocated on the basis of such group will hereinafter be described with reference to FIG. 13.

FIG. 13(a) is a conceptual diagram illustrating a group-based AID. In FIG. 13(a), some bits located at the front part of the AID bitmap may be used to indicate a group ID (GID). For example, it is possible to designate four GIDs using the first two bits of an AID bitmap. If a total length of the AID bitmap is denoted by N bits, the first two bits (B1 and B2) may represent a GID of the corresponding AID.

FIG. 13(b) is a conceptual diagram illustrating a group-based AID. In FIG. 13(b), a GID may be allocated according to the position of AID. In this case, AIDs having the same GID may be represented by offset and length values. For example, if GID 1 is denoted by Offset A and Length B, this means that AIDs (A~A+B−1) on bitmap are respectively set to GID 1. For example, FIG. 13(b) assumes that AIDs (1~N4) are divided into four groups. In this case, AIDs contained in GID 1 are denoted by 1~N1, and the AIDs contained in this group may be represented by Offset 1 and Length N1. AIDs contained in GID 2 may be represented by Offset (N1+1) and Length (N2−N1+1), AIDs contained in GID 3 may be represented by Offset (N2+1) and Length (N3−N2+1), and AIDs contained in GID 4 may be represented by Offset (N3+1) and Length (N4−N3+1).

In case of using the aforementioned group-based AIDs, channel accessg is allowed in a different time interval according to individual GIDs, the problem caused by the insufficient number of TIM elements compared with a large number of STAs can be solved and at the same time data can be efficiently transmitted/received. For example, during a specific time interval, channel access is allowed only for STA(s) corresponding to a specific group, and channel access to the remaining STA(s) may be restricted. A predetermined time interval in which access to only specific STA(s) is allowed may also be referred to as a Restricted Access Window (RAW).

Channel access based on GID will hereinafter be described with reference to FIG. 13(c). If AIDs are divided into three groups, the channel access mechanism according to the beacon interval is exemplarily shown in FIG. 13(c). A first beacon interval (or a first RAW) is a specific interval in which channel access to an STA corresponding to an AID contained in GID 1 is allowed, and channel access of STAs contained in other GIDs is disallowed. For implementation of the above-mentioned structure, a TIM element used only for AIDs corresponding to GID 1 is contained in a first beacon frame. A TIM element used only for AIDs corresponding to GID 2 is contained in a second beacon frame. Accordingly, only channel access to an STA corresponding to the AID contained in GID 2 is allowed during a second beacon interval (or a second RAW) during a second beacon interval (or a second RAW). A TIM element used only for AIDs having GID 3 is contained in a third beacon frame, such that channel access to an STA corresponding to the AID contained in GID 3 is allowed using a third beacon interval (or a third RAW). A TIM element used only for AIDs each having GID 1 is contained in a fourth beacon frame, such that channel access to an STA corresponding to the AID contained in GID 1 is allowed using a fourth beacon interval (or a fourth RAW). Thereafter, only channel access to an STA corresponding to a specific group indicated by the TIM contained in the corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is periodical or cyclical according to the beacon interval, the scope or spirit of the present disclosure is not limited thereto. That is, only AID(s) contained in specific GID(s) may be contained in a TIM element, such that channel access to STA(s) corresponding to the specific AID(s) is allowed during a specific time interval (for example, a specific RAW), and channel access to the remaining STA(s) is disallowed.

The aforementioned group-based AID allocation scheme may also be referred to as a hierarchical structure of a TIM. That is, a total AID space is divided into a plurality of blocks, and channel access to STA(s) (i.e., STA(s) of a specific group) corresponding to a specific block having any one of the remaining values other than '0' may be allowed. Therefore, a large-sized TIM is divided into small-sized blocks/groups, STA can easily maintain TIM information, and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of AID bitmap may represent a page ID (i.e., PID), the next N2 bits may represent a block ID, the next N3 bits may represent a sub-block ID, and the remaining bits may represent the position of STA bits contained in a sub-block.

In the examples of the present disclosure, various schemes for dividing STAs (or AIDs allocated to respective STAs) into predetermined hierarchical group units, and managing the divided result may be applied to the embodiments, however, the group-based AID allocation scheme is not limited to the above examples.

Frame Format

Figure 14:
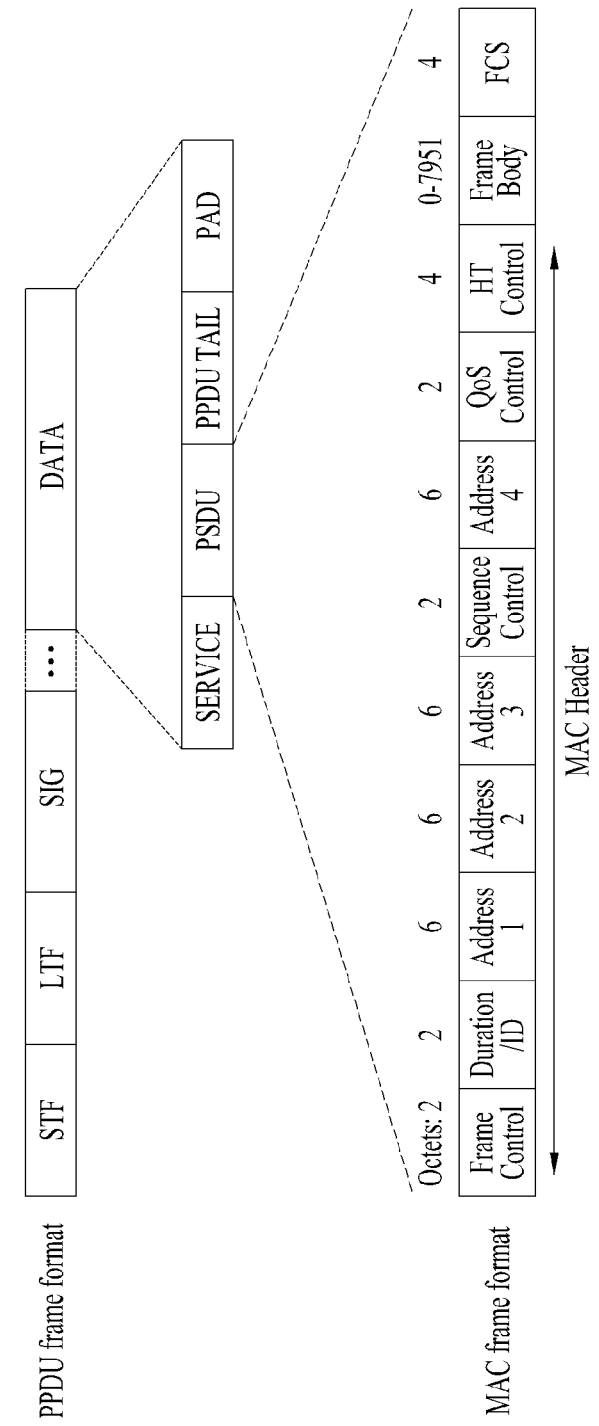
FIG. 14 is a conceptual diagram illustrating a frame structure for use in IEEE 802.11.

FIG. 14 is a diagram for explaining an exemplary frame format used in IEEE 802.11 system.

A Physical Layer Convergence Protocol (PLCP) Packet Data Unit (PPDU) frame format may include a Short Training Field (STF), a Long Training Field (LTF), a signal (SIG) field, and a data field. The most basic (for example, non-HT) PPDU frame format may be comprised of a Legacy-STF (L-STF) field, a Legacy-LTF (L-LTF) field, an SIG field, and a data field. In addition, the most basic PPDU frame format may further include additional fields (i.e., STF, LTF, and SIG fields) between the SIG field and the data field according to the PPDU frame format types (for example, HT-mixed format PPDU, HT-greenfield format PPDU, a VHT PPDU, and the like).

STF is a signal for signal detection, Automatic Gain Control (AGC), diversity selection, precise time synchronization, etc. LTF is a signal for channel estimation, frequency error estimation, etc. The sum of STF and LTF may be referred to as a PCLP preamble. The PLCP preamble may be referred to as a signal for synchronization and channel estimation of an OFDM physical layer.

The SIG field may include a RATE field, a LENGTH field, etc. The RATE field may include information regarding data modulation and coding rate. The LENGTH field may include information regarding the length of data. Furthermore, the SIG field may include a parity field, a SIG TAIL bit, etc.

The data field may include a service field, a PLCP Service Data Unit (PSDU), and a PPDU TAIL bit. If necessary, the data field may further include a padding bit. Some bits of the SERVICE field may be used to synchronize a descrambler of the receiver. PSDU may correspond to a MAC PDU (Protocol Data Unit) defined in the MAC layer, and may include data generated/used in a higher layer. A PPDU TAIL bit may allow the encoder to return to a state of zero (0). The padding bit may be used to adjust the length of a data field according to a predetermined unit.

MAC PDU may be defined according to various MAC frame formats, and the basic MAC frame is composed of a MAC header, a frame body, and a Frame Check Sequence. The MAC frame is composed of MAC PDUs, such that it can be transmitted/received through PSDU of a data part of the PPDU frame format.

A MAC header may include a frame control field, a Duration/ID field, an address field, etc. The frame control field may include control information requisite for frame transmission/reception. The Duration/ID field may be established as a specific time for transmitting the corresponding frame or the like. Four address fields (Address 1, Address 2, Address 3, Address 4) may indicate a Basic Service Set Identifier (BSSID), a Source Address (SA), a Destination Address (DA), a Transmitter Address (TA), a Receiver Address (RA), etc. Only some parts from among four address fields may be included according to frame type.

For example, an 'Address 1' field may be set to a specific value corresponding to a receiver address (RA) of a receiver configured to receive the corresponding MAC frame, and an 'Address 2' field may be set to a specific value corresponding to a transmitter address (TA) of a transmitter configured to transmit the corresponding MAC frame.

If three address fields are used, 'Address 1' field may be set to an RA, and 'Address 2' field may be set to a TA. 'Address 3' field may be set to a BSSID. In case of downlink (DL) (i.e., the case of 'From DS'), the 'Address 3' field may be set to a source address (SA) of the corresponding MAC frame. In case of uplink (UL) (i.e., the case of 'To DS'), the 'Address 3' field may be set to a Destination Address (DA) of the corresponding MAC frame.

If all four address fields are used, the 'Address 1' field may be set to an RA, the 'Address 2' field may be set to a TA, the 'Address 3' field may be set to a DA, and the 'Address 4' field may be set to an SA.

The value of each address field (Address 1, Address 2, Address 3, or Address 4) may be set to an Ethernet MAC address composed of 48 bits.

On the other hand, a null-data packet (NDP) frame format may indicate a frame format having no data packet. That is, the NDP frame includes a PLCP header part (i.e., STF, LTF, and SIG fields) of a general PPDU format, whereas it does not include the remaining parts (i.e., the data field). The NDP frame may be referred to as a short frame format.

Relay Protocol

A relay for extending network coverage may be introduced to a communication environment such as an M2M and smart grid. Since low-cost, low-complexity, and low-power devices are used in M2Ms and smart grid environments, a complicated relay protocol is not appropriate. Therefore, the simplified relay protocol proposed by the present disclosure is limited to two-hop relay operation. If the scope of the relay protocol is limited to simplified two-hop relay operation, relay frame forwarding can be simplified.

A relay may serve as an AP for other STAs. That is, STAs may consider the relay to be an AP, and may perform link establishment, such that the relay may be referred to as a Relay AP. However, the relay is not directly coupled to a distributed system (DS). Accordingly, in order to achieve connection between the relay and the DS, the relay must operate as an STA. That is, from the viewpoint of an AP directly coupled to the DS, the relay may correspond to one of a plurality of STAs, such that the relay may be referred to as a relay STA. For example, the relay may be logically understood as an entity composed of a relay AP and a relay STA.

Although the following description will disclose the Relay AP and the Relay STA from the viewpoint of relay operation, one must of course understand that the Relay AP and the Relay STA may comprise the same unitary relay entity.

In addition, for distinction between the Relay AP and the Relay STA, an AP directly coupled to the DS may be referred to as a Portal AP and a Root AP.

From the viewpoint of link establishment, STA, Relay, and Root AP operations can be summarized as follows.

STAs may search for the Relay AP through active/passive scanning. For example, if the STA transmits a probe request frame to the Relay AP, the Relay AP may transmit the probe response frame to the STA in the same manner as in a general AP. In addition, since the Relay APs transmit the beacon frame in the same manner as in the AP, STAs may search for the Relay AP through passive scanning.

If the STAs search for the multiple Relay APs, the STAs may select one Relay AP having the highest link quality so that the STAs may be associated with the corresponding Relay AP. If each STA can be connected to the Root AP, it may be directly associated with the corresponding Root AP.

On the other hand, although the Relay operates as an AP for another STA, the relay must pass through the Root AP to connect to the DS. That is, the Relay STA may search for the Root AP, and may be associated with the Root AP so as to perform link establishment.

Method for Discriminating Between Relay AP and Root AP

As described above, the Relay performs two functions. In more detail, the relay may operate as an AP (i.e., Relay AP) for STAs connected to the relay, and the other relay may operate as an STA (i.e., Relay STA) connected to the Root AP.

From the viewpoint of the STA, the Relay AP and the Root AP are considered to be APs. However, in order to correctly define relay operation, specific information indicating which AP is to operate as the Root AP or the Relay AP needs to be defined.

The present disclosure proposes a method for including specific information indicating whether the AP is used as a Root AP or Relay AP in a beacon frame, a probe response frame, an associated response frame, etc. transmitted from the AP. For example, the above information may be referred to as Device Category information or Relay element information.

The beacon frame and/or the probe response frame transmitted from the Relay AP may include ID information (e.g., MAC address or BSSID) for identifying the Root AP connected as a relay STA. That is, assuming that the relay acting as the Relay STA is associated with the Root AP in a manner that the Relay is connected to the BS, the beacon frame and/or the probe response frame transmitted from the Relay (i.e., Relay AP having the same entity as the Relay STA) may include a MAC address or a BSSID of the Root AP (i.e., Root AP associated with the Relay STA).

Relay Frame Format

To enable the Relay AP to serve as an AP for STAs connected thereto, the Relay AP can operate in the same manner as a general AP. For example, the Relay AP supports scanning of another STA through the beacon frame, the probe response frame, etc., and supports various channel access mechanisms, management frame exchange, etc.

If the STA is associated with the Relay AP, frames transmitted from the STA can be transferred to the Root AP through the Relay AP. Here, the frame format transmitted from the STA to the Relay AP may be identical in structure to an uplink frame format transmitted from the STA to a general AP. Conversely, a frame format used when the frame received by the relay STA from the STA is transferred to the Root AP may be configured in the form of an aggregate MAC Service Data Unit (MAC SDU) (A-MSDU). A-MSDU may include a plurality of MAC SDUs, and may be contained in one MAC PDU and then transmitted.

Figure 15:
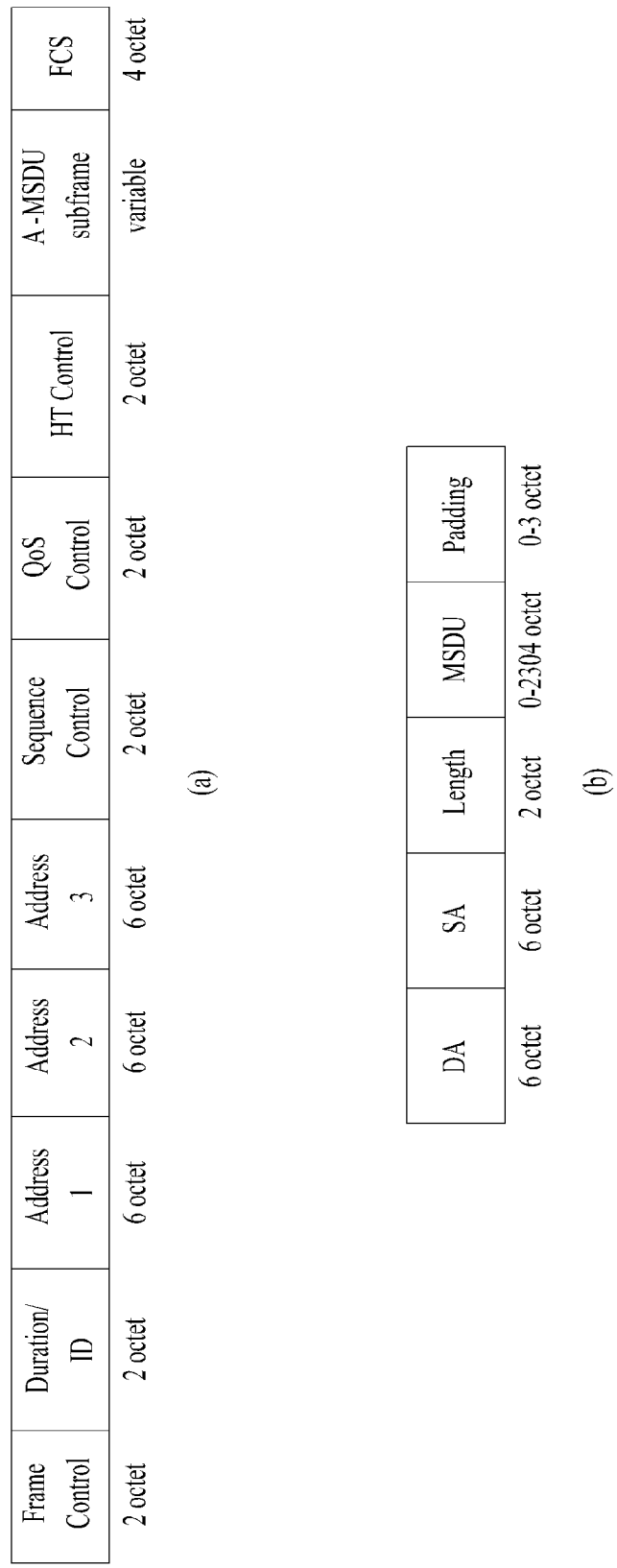
FIGS. 15(a) and 15(b) are conceptual diagrams illustrating a frame format for use in a Relay STA and a Root AP.

FIG. 15 is a conceptual diagram illustrating a frame format used between the Relay STA and the Root AP. FIG. 15(a) shows an example of an A-MSDU format, and FIG. 15(b) shows an example of one A-MSDU subframe field. That is, one or more A-MSDU subframe fields may be contained in the frame format of FIG. 15(a).

Frames relayed between the Relay STA and the Root AP may use the A-MSDU format shown in FIG. 15(a).

For example, assuming that the Relay STA relays the frame received from the STA to the Root AP, Address 1, Address 2, and Address 3 fields of FIG. 15(a) can be established as follows.

The Address 1 field may be set to a MAC address of the Root AP (i.e., a receiver of the MAC PDU).

The Address 2 field may be set to a MAC address of the Relay STA (i.e., a transmitter of the MAC PDU).

The Address 3 field may be set to a BSSID (i.e., MAC address of the Root AP).

Additionally, the Address 1, Address 2, and Address 3 fields may be set to addresses for transmitting the MAC PDU from the Relay STA to the Root AP. Assuming that the Root AP having received the addresses does not recognize a specific location from which the relayed frame starts and a destination location at which the relayed frame will arrive, it is impossible to correctly recognize the corresponding frame. In addition, an A-MSDU transferred from the Relay STA to the Root AP includes a plurality of MSDUs, and respective MSDUs may be transmitted from different STAs to the Relay AP. Therefore, in order to correctly process multiple MSDUs contained in the A-MSDU by the Root AP, a departure STA and a destination STA of each MSDU must be clearly specified.

Accordingly, a source address (SA) of the relayed frame and a destination address (DA) of the relayed frame must be contained in a frame relayed between the Relay AP and the Root AP For this purpose, subfields (i.e., a DA field and an SA field) of the A-MSDU subframe field can be used as shown in FIG. 15(b).

For example, the DA field of the A-MSDU subframe field may be set to a destination address (DA) value of the corresponding MSDU, and the SA field of the A-MSDU subframe field may be set to a source address (DA) value of the corresponding MDSU. For example, the DA field of the A-MSDU subframe field corresponding to the MSDU transmitted from the STA to the DS may be set to a MAC address of the DS, and the SA field may be set to a MAC address of the STA. Alternatively, the DA field of the A-MSDU subframe field corresponding to the MSDU transmitted from the DS to the STA may be set to a MAC address of the STA, and the SA field may be set to a MAC address of the DS.

Figure 16:
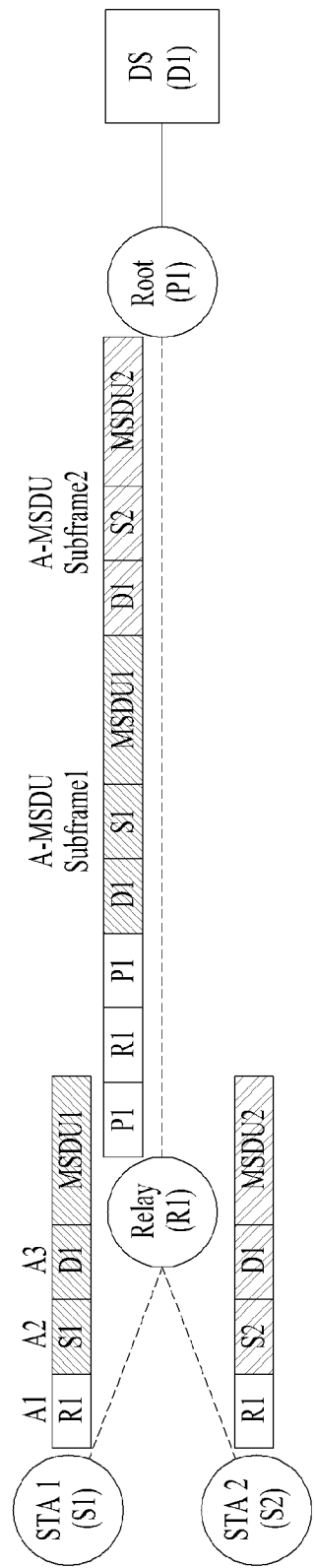
FIG. 16 is a conceptual diagram illustrating a PPDU relay operation using an A-MSDU frame structure in UL transmission.

FIG. 16 is a conceptual diagram illustrating a PPDU relay operation using the A-MSDU frame structure in UL transmission.

In FIG. 16, it is assumed that MAC addresses of STA1, STA2, Relay, and Root AP are set to S1, S2, R1, and P1, respectively. It is assumed that a MAC address of the DS or a MAC address of the counterpart entity communicating with the STA through the DS is set to D1.

STA1(S1) transmits MSDU1 to Relay(R1), and STA2(S2) transmits MSDU2 to Relay(R1). Each destination location of MSDU1 and MSDU2 is set to DS(D1).

The Address 1 (A1) field (i.e., receiver address) of the MAC header transmitted from STA1(S1) to Relay(R1) is set to R1, the Address 2 (A2) field (i.e., transmitter address) is set to S1, and the Address 3 (A3) field (i.e., a destination address) is set to D1.

The Address 1 (A1) field (i.e., receiver address) of the MAC header transmitted from STA2(S2) to Relay(R1) is set to R1, the Address 2 (A2) field (i.e., transmitter address) is set to S2, and the Address 3 (A3) field (i.e., a destination address) is set to D1.

The Relay having received MSDU1 and MSDU2 from STA1 and STA2, respectively, may aggregate the received frames into an A-MSDU subframe, and may relay the aggregated result to the Root AP.

In order to provide MSDU1 and MSDU2 to the DS, the Relay must relay frames received from STA1 and STA2 to the Root AP. In this case, MSDU1 and MSDU2 are aggregated in the form of A-MSDU subframe by the Relay STA.

Referring to FIG. 16, MAC PDU of a PPDU transmitted from the Relay STA to the Root AP is configured in the form of A-MSDU. Referring to FIG. 15(a), the A1 field (i.e., a receiver address) of the A-MSDU header is set to P1, and the A2 field (i.e., a transmitter address) is set to R1, and the A3 field is set to P1 corresponding to a BSSID. The DA field and the SA field of the header of the A-MSDU subframe 1 may be respectively set to a destination address (D1) and a source address (S1) of the MSDU1. The DA field and the SA field of the header of the A-MSDU subframe 2 may be respectively set to a destination address (D1) and a source address (S2) of the MSDU2.

In the case of using the A-MSDU format in the relay operation, whereas the same transmitter address (TA) and the same receiver address (RA) are established, frames allocated to different source addresses (SA) and different destination addresses (DA) are aggregated, resulting in increased throughput. Assuming that the A-MSDU format is not used, fields indicating RA, TA, SA and DA must be contained in the MAC header of the MAC frame so as to relay the MSDU1 by the Relay, and fields indicating RA, TA, SA and DA must be contained in the MAC header of a separate MAC frame. In the case of using the A-MSDU format without the need to define a new MAC header, RA and TA having the same value are not repeatedly transmitted during MSDU1 relaying and MSDU2 relaying from the Relay STA to the Root AP, and frames having various SAs and DAs can be aggregated and transmitted, such that resources can be efficiently used.

Figure 17:
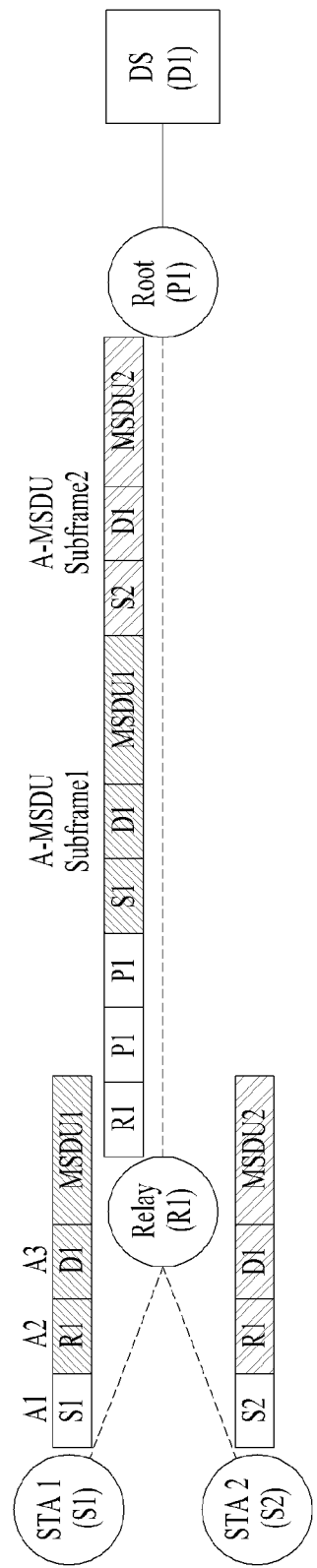
FIG. 17 is a conceptual diagram illustrating a PPDU relay operation using an A-MSDU frame structure in DL transmission.

FIG. 17 is a conceptual diagram illustrating a PPDU relay operation using an A-MSDU frame structure in DL transmission.

In FIG. 17, it is assumed that MAC addresses of STA1, STA2, Relay, and Root AP are set to S1, S2, R1, and P1, respectively. It is assumed that a MAC address of the DS or a MAC address of the counterpart entity communicating with the STA through the DS is set to D1.

Frames respectively transmitted from DS (D1) to STA1 (S1) and STA2(S2) can be transmitted from the Root AP to the Relay STA using the A-MSDU format. Referring to FIG. 15(a), in the MAC header of the A-MSDU format transmitted from the Root AP (P1) to the Relay STA(R1), the A1 field (i.e., RA) is set to R1, the A2 field (i.e., TA) is set to P1, and the A3 field is set to P1 acting as a BSSID. The DA field and the SA field of the A-MSDU subframe 1 are set to a destination address (S1) and a source address (D1), respectively. The DA field and the SA field of the header of the A-MSDU subframe 2 are set to a destination address (S2) and a source address (D1) of the MSDU2, respectively.

The Relay STA(R1) may extract MSDU1 and MSDU2 from the A-MSDU format received from the Root AP (P1), and may respectively relay the MSDU1 and the MSDU2 to the STA1 and STA2. Since MSDU1 and MSDU2 have different receiver addresses (RAs), the MSDU1 and the MSDU2 cannot be transmitted as one MAC PDU and are configured as different MAC PDUs and then transmitted. That is, frames transmitted from the Relay AP(R1) to each of STA1(S1) and STA2(S2) are not configured in the form of the A-MSDU subframe, and are configured to use a general DL frame format. In more detail, the Relay AP(R1) may allocate the value of S1 to the A1 field (i.e., RA) of a header of the MAC PDU including MSDU1 transmitted to STA1(S1), allocate the value of R1 to the A2 field (i.e., TA), and allocate the value of D1 to the A3 field (i.e., SA). In addition, the Relay AP(R1) may allocate 'S2' to the A1 field (i.e., RA) of a header of the MAC PDU including MSDU2 transmitted to STA2(S2), allocate 'R1' to the A2 field (i.e., TA), and allocate 'D1' to the A3 field (i.e., SA).

Multicast/Broadcast Protocol in Relay Network

Multicast refers to transmission to STAs belonging to a specific group, and a multicast frame refers to a frame in which a destination address (DA) or a receiver address (RA) (or A1) is set as a group address. To indicate the group address (or the multicast address), the group bit of a MAC address may be set to 1. A broadcast frame refers to a frame transmitted toward all STAs, and a broadcast address refers to a unique group address specifying all STAs. Accordingly, the multicast address and/or broadcast address (namely, the multicast/broadcast address) may correspond to a group address. In this sense, a multicast frame and/or broadcast frame (i.e., a multicast/broadcast frame) may be referred to as a group addressed message or group addressed frame. In the case of multicast, groups indicated by group addresses may be preset as shown in the form of, for example, a table.

Hereinafter, description will be given of examples of a multicast/broadcast frame transfer process in a network including a relay (namely a relay network).

Multicast/Broadcast Method 1 in Relay Network

Hereinafter, an example of the present disclosure will be described in detail.

When an STA serves as a source of a multicast/broadcast frame, the STA may unicast the multicast/broadcast frame to the relay STA. Herein, in the multicast/broadcast frame which the STA unicasts to the relay STA, the A1 field may be set to the MAC address of the relay STA, the A2 field may be set to the MAC address of the STA serving as a source of the multicast/broadcast frame, and the A3 field may be set to a multicast/broadcast MAC address (i.e., group address) corresponding to a destination address.

Once the relay STA receives the multicast/broadcast frame from the STA, the relay STA may deliver, in a broadcasting manner, the received multicast/broadcast frame for the other STAs in the BSS which the relay STA configures (as a relay AP). Herein, in the multicast/broadcast frame transmitted by the relay STA, the A1 field may be set to a multicast/broadcast MAC address (i.e., group address), the A2 field may be configured as the MAC address of the relay STA, and the A3 field may be configured as the MAC address of the STA serving as the source of the multicast/broadcast frame.

Meanwhile, the STA serving as the source of the multicast/broadcast frame may also receive the multicast/broadcast frame broadcast by the relay STA. The STA may discard (or filter out) the received multicast/broadcast frame. In the description given below, discarding or filtering out a received frame means that the frame is not processed.

The relay STA may transmit, to a root AP, the multicast/broadcast frame received from the STA. The relay STA may transmit the multicast/broadcast frame to the root AP using the A-MSDU format as shown in FIG. 16. In this case, in the frame which the relay STA transmits to the root AP, the A1 field may be set to the MAC address of the root AP, the A2 field may be set to the MAC address of the relay STA, and the A3 field may be set to a BSSID value. Meanwhile, a source address and destination address of the multicast/broadcast frame received by the relay STA must be delivered. To this end, an A-MSDU subframe is used. The DA field of the A-MSDU subframe may be set to the multicast/broadcast MAC address (i.e., group address) of the multicast/broadcast frame transmitted by the STA. In addition, the SA field of the A-MSDU subframe may be set to the MAC address of the STA serving as the source of the multicast/broadcast frame.

The root AP receiving the multicast/broadcast frame from the relay STA may deliver, in a broadcasting manner, the received multicast/broadcast frame for the other STAs (including the relay STA) in the BSS which the root AP configures. In the multicast/broadcast frame broadcast by the root AP, the A1 field may be set to a multicast/broadcast MAC address (i.e., group address), the A2 field may be set to the MAC address of the root AP, and the A3 field may be set to the MAC address of an STA that has initially transmitted the multicast/broadcast frame to the relay STA (namely, the STA serving as the source of the multicast/broadcast frame).

Relay STAs receiving the multicast/broadcast frame from the root AP may determine whether an STA having an address corresponding to the value of the A3 field of the received multicast/broadcast frame is connected thereto.

If the STA having an address corresponding to the value of the A3 field of the multicast/broadcast frame that the relay STA receives from the root AP is connected to the relay STA, the relay STA may discard the multicast/broadcast frame received from the root AP in order to avoid redundant transmission.

If the STA having an address corresponding to the value of the A3 field of the multicast/broadcast frame that the relay STA receives from the root AP is not connected to the relay STA, the relay STA may deliver, in the broadcasting manner, the multicast/broadcast frame for the other STAs in the BSS which the relay STA configures (as a relay AP). In the multicast/broadcast frame broadcast by the relay STA, the A1 field may be set to a multicast/broadcast MAC address (i.e., group address), the A2 field may be set to the MAC address of the relay STA, and the A3 field may be set to the MAC address of an STA that has initially transmitted the multicast/broadcast frame to the relay STA (namely, the STA serving as the source of the multicast/broadcast frame).

Multicast/Broadcast Method 2 in Relay Network

In the example above, description has been given of a method in which a relay STA broadcasts a multicast/broadcast frame received from an STA to STAs in a BSS which the relay STA configures and unicast the same to a root AP.

As an additional example, a relay STA may deliver a multicast/broadcast frame received from an STA to the root AP in a unicasting manner first. That is, a relay STA receiving a multicast/broadcast frame from an STA may unicast the received multicast/broadcast frame to the root AP without broadcasting the received frame to STSs within the BSS which the relay STA configures.

Subsequently, the root AP may deliver, in a broadcasting manner, the multicast/broadcast frame for the other STAs (including the relay STA) in the BSS thereof. The relay STA receiving the multicast/broadcast frame from the root AP may deliver, in the broadcasting manner, the received multicast/broadcast frame for STAs in the BSS which the relay STA configures.

Hereinafter, this example will be described in detail.

If the STA serves as the source of the multicast/broadcast frame, the STA may unicast the multicast/broadcast frame to the relay STA. In the multicast/broadcast frame unicast by the STA to the relay STA, the A1 field may be set to the MAC address of the relay STA, the A2 field may be set to the MAC address of the STA serving as the source of the multicast/broadcast frame, and the A3 field may be set to a multicast/broadcast MAC address (i.e., group address) corresponding to a destination address.

Subsequently, the relay STA may unicast the multicast/broadcast frame received from the STA to the root AP. The relay STA may transmit the multicast/broadcast frame to the root AP using the A-MSDU format as shown in FIG. 16. In this case, in the frame which the relay STA transmits to the root AP, the A1 field may be set to the MAC address of the root AP, the A2 field may be set to the MAC address of the relay STA, and the A3 field may be set to a BSSID value. Meanwhile, a source address and destination address of the multicast/broadcast frame received by the relay STA must be delivered. To this end, an A-MSDU subframe is used. The DA field of the A-MSDU subframe may be set to the multicast/broadcast MAC address (i.e., group address) of the multicast/broadcast frame transmitted by the STA. In addition, the SA field of the A-MSDU subframe may be set to the MAC address of the STA serving as the source of the multicast/broadcast frame.

The root AP receiving the multicast/broadcast frame from the relay STA may deliver, in a broadcasting manner, the received multicast/broadcast frame for the other STAs (including the relay STA) in the BSS which the root AP configures. In the multicast/broadcast frame broadcast by the root AP, the A1 field may be set to a multicast/broadcast MAC address (i.e., group address), the A2 field may be set to the MAC address of the root AP, and the A3 field may be set to the MAC address of an STA that has initially transmitted the multicast/broadcast frame to the relay STA (namely, the STA serving as the source of the multicast/broadcast frame).

Each relay STA receiving the multicast/broadcast frame from the root AP may deliver, in a broadcasting manner, the multicast/broadcast frame for the other STAs in the BSS which each relay STA configures (as a relay AP). In the multicast/broadcast frame broadcast by the relay STA, the A1 field may be set to a multicast/broadcast MAC address (i.e., group address), the A2 field may be set to the MAC address of the relay STA, and the A3 field may be set to the MAC address of an STA that has initially transmitted the multicast/broadcast frame to the relay STA (namely, the STA serving as the source of the multicast/broadcast frame).

Meanwhile, the STA serving as the source of the multicast/broadcast frame may also receive the multicast/broadcast frame broadcast by the relay STA. The STA may discard the received multicast/broadcast frame. For example, if an STA having transmitted a multicast/broadcast frame to the relay STA or root AP receives back the multicast/broadcast frame, the STA may discard the received frame. That is, if the value of the source address field (e.g., the A3 field) of a multicast/broadcast frame delivered from the relay STA or root AP in a broadcasting manner is identical to the MAC address of the STA, the STA may discard the multicast/broadcast frame.

When the relay STA receives a multicast/broadcast frame from the DS, and delivers the multicast/broadcast frame within a relay network, the relay STA delivers the multicast/broadcast frame to the root AP in a unicasting manner first. Thereby, the root AP may deliver the multicast/broadcast frame to STAs (including the relay STA) in the BSS thereof in a broadcasting manner, and each of relay STAs receiving the multicast/broadcast frame may deliver the frame to STAs in the BSS thereof in a broadcasting manner.

Although A-MSDU has been described in the examples given above as being used as a frame format transmitted from the relay STA to the root AP, the scope of the present disclosure is not limited thereto. For example, in place of the A-MSDU, any frame including four address fields of a receiver address (RA), transmitter address (TA), destination address (DA) and source address (SA) may be used as a frame transmitted to the root AP by the relay STA in the proposed multicast/broadcast methods in a relay network. For example, a frame having a MAC header including the RA, TA, DA and SA may be used. In this case, the A1 field (i.e., RA field) of the frame may be set to the MAC address of the root AP, the A2 field (i.e., TA field) of the frame may be set to the MAC address of the relay STA, the A3 field (i.e., DA field) of the frame may be set to the multicast/broadcast MAC address (i.e., group address) of a multicast/broadcast frame that the STA transmits, and the A4 field (i.e., SA field) of the frame may be set to the MAC address of an STA serving as the source of the multicast/broadcast frame.

Figure 18:
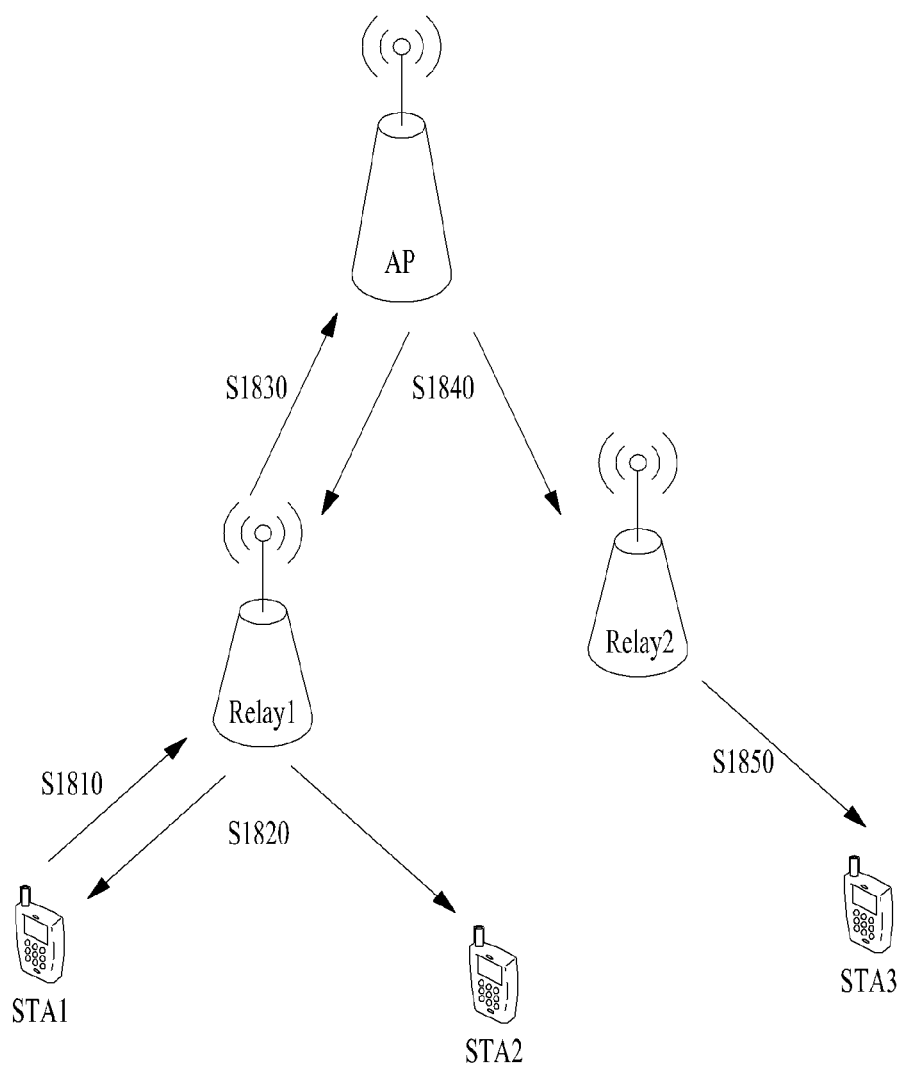
FIGS. 18 and 19 illustrate multicast/broadcast methods in a relay network according to embodiments of the present disclosure.
Figure 19:
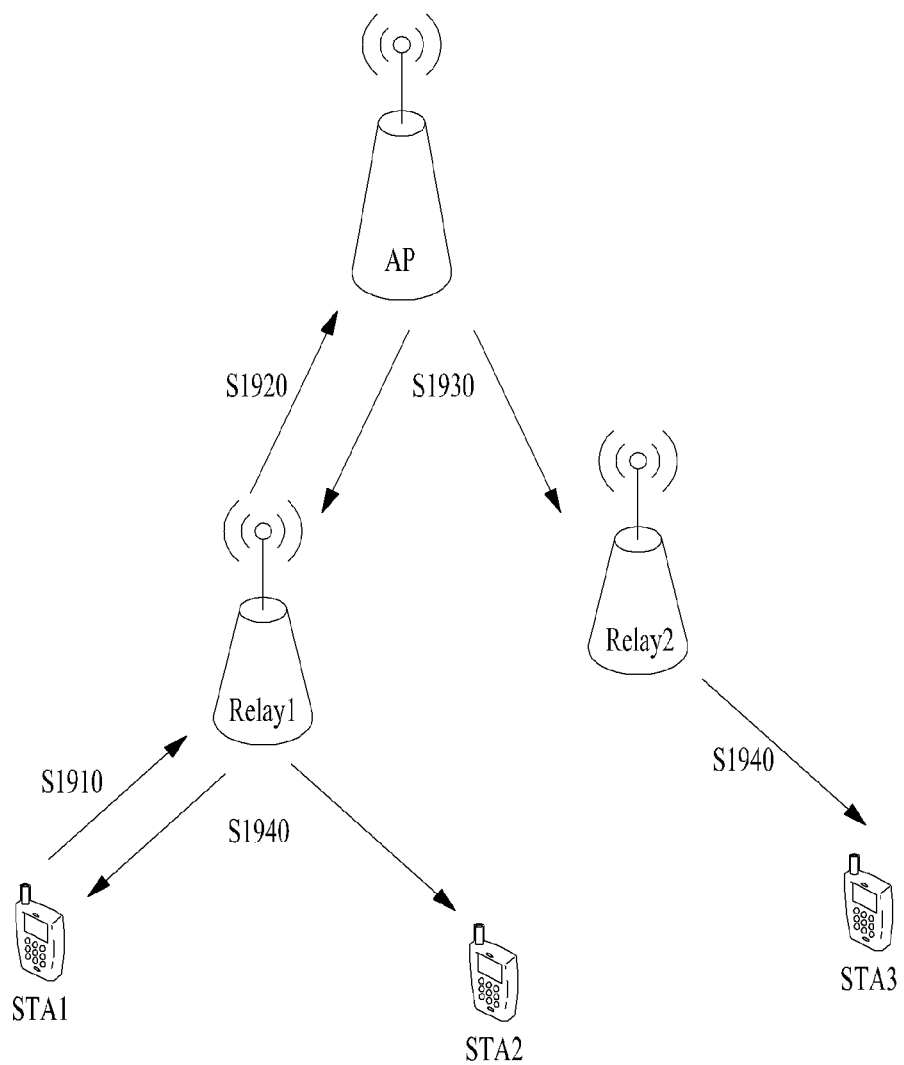

FIGS. 18 and 19 illustrate multicast/broadcast methods in a relay network according to embodiments of the present disclosure.

FIGS. 18 and 19 exemplarily show Relay1, Relay2, an AP (i.e., the root AP) associated with the Relay1 and Relay2, STA1 and STA2 associated with Relay1, and STA3 associated with Relay2. However, embodiments of the present disclosure are not limited thereto. One or more relay entities may be associated with one AP (i.e., the root AP), more STAs may be associated with a relay entity, or there may be STAs which are directly associated with an AP without assistance from a relay.

A relay entity (e.g., Relay1 or Relay 2) may serve as a relay STA for the root AP, and serves as a relay AP for an STA (e.g., STA1 and STA2, or STA3). That is, a relay entity logically includes a relay STA and a relay AP.

Hereinafter, description will be given of a multicast/broadcast method in a relay network shown in FIG. 18.

Referring to FIG. 18, in step S1810, Relay1 may receive a multicast/broadcast frame from STA1 in a unicasting manner.

In step S1820, Relay1 may broadcast the multicast/broadcast frame received from STA1 in step S1810 to STAs (STA1, STA2, . . . ) in the BSS which the Relay1 configures.

In step S1830, Relay1 may deliver the multicast/broadcast frame received from STA1 in step S1810 to an AP associated therewith in a unicasting manner.

In step S1840, the AP may transmit the multicast/broadcast frame received in step S1830 to STAs (Relay1, Relay2, . . . ) in the BSS thereof in a broadcasting manner.

In step S1850, Relay 2 may transmit the frame to STAs (e.g., STA3, . . . ) in the BSS which Relay 2configures in broadcasting manner.

Meanwhile, when Relay1 receives the multicast/broadcast frame transmitted from the AP in step S1840 in the broadcasting manner, Relay1 may check the source address of the frame and discard the frame.

Hereinafter, description will be given of a multicast/broadcast method in a relay network shown in FIG. 19.

Referring to FIG. 19, in step S1910, Relay1 may receive a multicast/broadcast frame from STA1 in a unicasting manner.

In step S1920, Relay1 may deliver the multicast/broadcast frame received from STA1 in step S1910 to the AP associated therewith in a unicasting manner.

In step S1930, the AP may transmit the multicast/broadcast frame received in step S1920 to STAs (Relay1, Relay2. . . ) in the BSS thereof in a broadcasting manner.

In step S1940, each of Relay1 and Relay2 may transmit, in a broadcasting manner, the frame to STAs (STA1, STA2 . . . , or STA3, . . . ) in a BSS which each of Relay1 and Relay 2 configures.

For configuration and processing of a frame transmitted to or from a relay entity in the examples of FIGS. 18 and 19, various embodiments of the present disclosure described above may be applied.

The exemplary methods shown in FIGS. 18 and 19 are expressed as a series of operations for simplicity of description, but this is not intended to limit the order in which the steps are performed. If necessary, some steps may be performed simultaneously or in a different order. In addition, not all steps shown in FIGS. 18 and 19 are needed to implement the proposed method of the present disclosure.

In implementing the methods of the present disclosure illustrated in FIGS. 18 and 19, various embodiments of the present disclosure described above may be independently applied, or two or more of the embodiments may be applied in combination.

Figure 20:
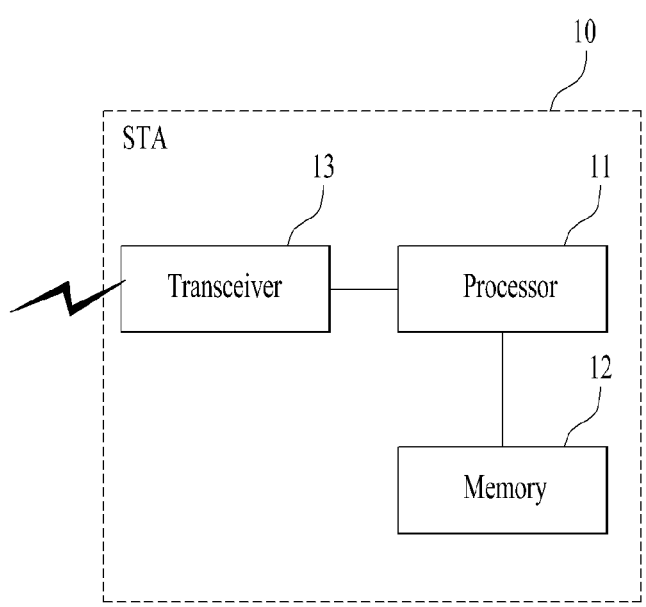
FIG. 20 is a block diagram illustrating a radio frequency apparatus according to one embodiment of the present disclosure.

FIG. 20 is a block diagram illustrating a radio frequency apparatus according to one embodiment of the present disclosure.

An STA 10 may include a processor 11, a memory 12, and a transceiver 13. The transceiver 13 may transmit/receive radio signals and implement, for example, a physical layer according to an IEEE 802 system. The processor 11 may be connected to the transceiver 13 to implement a physical layer and/or MAC layer according to an IEEE 802 system. The processor 11 may be configured to perform operations according to the various embodiments of the present disclosure described above. In addition, modules to implement operations according to the various embodiments of the present disclosure described above may be stored in the memory 12 and executed by the processor 11. The memory 12 may be contained in or installed outside the processor 11 and connected to the processor 11 via well-known means.

The STA 10 of FIG. 20 may be configured as a relay entity. The processor 11 may control the relay entity to transmit/receive a multicast/broadcast frame to/from an STA and to/from an AP.

The specific configuration of the apparatus described above may be implemented such that the details of the various embodiments of the present disclosure described above are independently applied, or two or more of the embodiments are applied together. For clarity, redundant description is omitted.

Embodiments of the present invention may be implemented by various means such as, for example, hardware, firmware, software, or combinations thereof.

When practiced in hardware, methods according to embodiments of the present disclosure may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When practiced in firmware or software, methods according to embodiments of the present disclosure may be implemented in the form of a module, a procedure, a function, or the like which performs the functions or operations described above. Software code may be stored in the memory unit and executed by the processor. The memory unit may be disposed inside or outside the processor to transceive data with the processor via various well-known means.

Preferred embodiments of the present disclosure have been described in detail above to allow those skilled in the art to implement and practice the present disclosure. Although the preferred embodiments of the present disclosure have been described above, those skilled in the art will appreciate that various modifications and variations can be made in the present disclosure without departing from the spirit and scope of the disclosure set forth in the claims below. Thus, the present disclosure is not intended to be limited to the embodiments described herein, but is intended to include the widest range of embodiments corresponding to the principles and novel features disclosed herein.

INDUSTRIAL APPLICABILITY

Various embodiments of the present disclosure have been described through examples applied to an IEEE 802.11 system, but they may also be applied to other wireless access systems in the same manner.

The invention claimed is:

1. A method for delivering a multicast/broadcast frame by a relay entity in a wireless local area network (WLAN) system, the method comprising:
receiving the multicast/broadcast frame from a station (STA); and
delivering the multicast/broadcast frame to a root access point (root AP),
wherein the multicast/broadcast frame is broadcast by the root AP within a basic service set (BSS),
wherein the multicast/broadcast frame broadcast by the root AP comprises:
an Address 1 (A1) field set to a multicast/broadcast address;
an Address 2 (A2) field set to a medium access control (MAC) address of the root AP; and
an Address 3 (A3) field set to a MAC address of the STA, the MAC address being a source address of the multicast/broadcast frame, and
wherein, upon receiving the multicast/broadcast frame broadcast by the root AP, an STA having an address identical to the source address of the multicast/broadcast frame broadcast by the root AP discards the multicast/broadcast frame broadcast by the root AP.

2. The method according to claim 1, wherein, when the multicast/broadcast frame delivered to the root AP is an aggregate-MAC service data unit (A-MSDU) frame, the A-MSDU frame comprises:
an A1 field set to the MAC address of the root AP;
an A2 field set to a MAC address of the relay entity; and
an A3 field set to a basic service set identifier (BSSID),
wherein an A-MSDU subframe of the A-MSDU frame comprises:
a destination address (DA) field set to the multicast/broadcast address; and
a source address (SA) field set to the MAC address of the STA, the MAC address being the source address of the multicast/broadcast frame.

3. The method according to claim 1, wherein, when the multicast/broadcast frame delivered to the root AP has four address fields,
the four address fields comprises:
an A1 field set to the MAC address of the root AP;
an A2 field set to a MAC address of the relay entity;
an A3 field set to the multicast/broadcast address; and
an A4 (Address 4) field set to the MAC address of the STA, the MAC address being the source address of the multicast/broadcast frame.

4. The method according to claim 1, wherein
the multicast/broadcast frame, which is received by the relay entity, is delivered to the relay entity by the STA as a unicast transmission rather than being broadcast.

5. The method according to claim 1, wherein, the multicast/broadcast frame, which is received from the STA, is delivered to the root AP by the relay entity as a unicast transmission rather than being broadcast.

6. The method according to claim 1, wherein the STA is associated with the relay entity.

7. The method according to claim 1, wherein the relay entity is associated with the AP.

8. A relay for delivering a multicast/broadcast frame in a wireless local area network (WLAN) system, the relay comprising:
a transceiver; and
a processor, that controls the transceiver to:
receive the multicast/broadcast frame from a station (STA); and
deliver the multicast/broadcast frame to a root access point (root AP),
wherein the multicast/broadcast frame is broadcast by the root AP within a basic service set (BSS),
wherein the multicast/broadcast frame broadcast by the root AP comprises:
an Address 1 (A1) field set to a multicast/broadcast address;
an Address 2 (A2) field set to a medium access control (MAC) address of the root AP; and
an Address 3 (A3) field set to a MAC address of the STA, the MAC address being a source address of the multicast/broadcast frame,
wherein, upon receiving the multicast/broadcast frame broadcast by the root AP, an STA having an address identical to the source address of the multicast/broadcast frame broadcast by the root AP discards the multicast/broadcast frame broadcast by the root AP.

9. The relay according to claim 8, wherein, when the multicast/broadcast frame delivered to the root AP is an aggregate-MAC service data unit (A-MSDU) frame,
the A-MSDU frame comprises:
an A1 field set to the MAC address of the root AP;
an A2 field set to a MAC address of the relay entity; and
an A3 field set to a basic service set identifier (BSSID),
wherein an A-MSDU subframe of the A-MSDU frame comprises:

a destination address (DA) field set to the multicast/broadcast address; and a source address (SA) field set to the MAC address of the STA, the MAC address being the source address of the multicast/broadcast frame.

10. The relay according to claim 8, wherein, when the multicast/broadcast frame delivered to the root AP has four address fields, the four address fields comprises:

an A1 field set to the MAC address of the root AP;

an A2 field set to a MAC address of the relay entity;

an A3 field set to the multicast/broadcast address; and an A4 (Address 4) field set to the MAC address of the STA, the MAC address being the source address of the multicast/broadcast frame.

11. The relay according to claim 8, wherein the multicast/broadcast frame, which is received by the relay entity, is delivered to the relay entity by the STA as a unicast transmission rather than being broadcast.

12. The relay according to claim 8, wherein the multicast/broadcast frame, which is received from the STA, is delivered to the root AP by the relay entity as a unicast transmission rather than being broadcast.

13. The relay according to claim 8, wherein the STA is associated with the relay entity.

14. The relay according to claim 8, wherein the relay entity is associated with the AP.

* * * * *